UNITED STATES PATENT OFFICE.

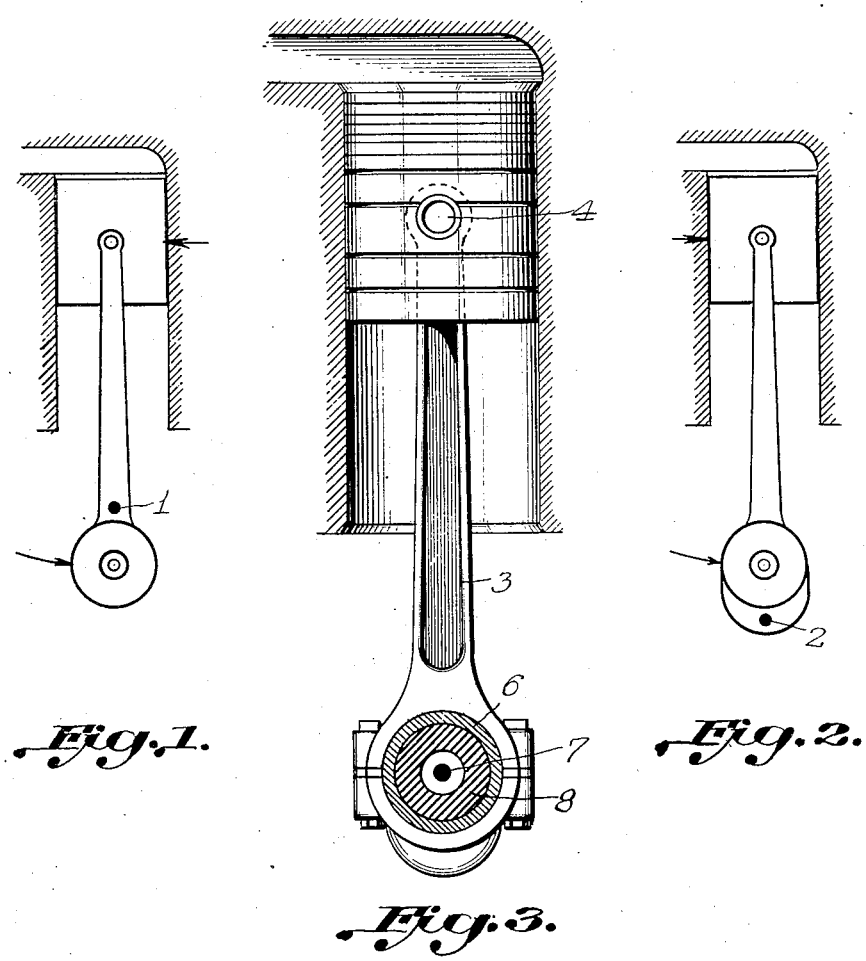

ROBERT A. WEINHARDT, OF DETROIT, MICHIGAN, ASSIGNOR TO CONTINENTAL MOTORS CORPORATION, OF DETROIT, MICHIGAN, A CORPORATION OF VIRGINIA.

CONNECTING-ROD.

1,350,580.  Specification of Letters Patent.  Patented Aug. 24, 1920.

Application filed May 31, 1918. Serial No. 237,607.

*To all whom it may concern:*

Be it known that I, ROBERT A. WEINHARDT, a citizen of the United States of America, residing at Detroit, in the county of Wayne and State of Michigan, have invented certain new and useful Improvements in Connecting-Rods, of which the following is a specification, reference being had therein to the accompanying drawings.

This invention relates to improvements in connecting rods for engines, pertaining more particularly to rods employed in connection with internal combustion motors, although not limited to such use.

Among the objects of the invention are to provide a rod of this type wherein the conditions of "side slap" are eliminated; to provide a rod which is practically unaffected by the conditions produced by the sudden direction of motion of the crank shaft portion of the rod in use.

To these and other ends, the nature of which will be readily understood as the invention is hereinafter disclosed, said invention consists in the improved construction and arrangement of parts hereinafter more fully described, illustrated in the accompanying drawings, and more particularly pointed out in the appended claims.

In the accompanying drawings, in which similar reference characters indicate similar parts in each of the views,—

Figures 1 and 2 are diagrammatic views of a piston, crank-shaft and connecting rods illustrating incorrect forms of the rod according to the present invention.

Fig. 3 is a view partly in section and partly in elevation showing a connecting rod of the present invention in position for use.

In the cycle of movement described by a piston and connecting rod, especially in upright types of engines, the connecting rod has an oscillatory motion which is not unlike a pendulum, as the lower portion or the part connected to the crank shaft of the engine, swings back and forth with the cross head or piston pin as an axis of suspension.

In engines of high speed type, the sudden reversal of direction of motion of the crank shaft portion of the connecting rod as the crank shaft passes its extreme lateral limits of movements on either side of the engine center, is akin to the reversal of direction of a pendulum as it reaches the end of its swing, but in the case of the connecting rod, the reversal is so sudden that the effect on the rod is the same as if a violent blow had been struck the rod in a plane which passes through the point of connection with the crank shaft at substantially right angles to the rectilinear movement of the former, and a distinct sidewise shock or blow is given to the other end connection of the rod.

When a body which is swinging from a center is struck on the sides, lateral vibrations are set up therein, and these run through the body with regular points of maximum intensity and corresponding points of rest or nodes. When a connecting rod is thus given a sidewise shock or blow by this almost instantaneous change of lateral direction, vibrations are set up therein which impart a decided lateral shock or blow to the pin and the piston end of the rod. In horizontal type or double-acting or steam engines, this side shock is taken up by the cross head which travels in guides, or by the piston stem which is in turn supported, in part at least, by a stuffing box. In the single-acting or the internal combustion types having no cross head or piston stem, the blow which occurs twice in each shaft revolution, is thus communicated to the piston by the rod and causes what is known as "side slap" and unless the piston is extremely tight, a decided knock is heard and the effect is deleterious to the piston, the cylinder and the connections of the piston rod with the cylinder.

The direction of shock to the piston depends entirely upon the proportion and design of the connecting rod. Where the center of mass of the latter is between the piston pin connection and the crank shaft, as indicated in Fig. 1, at 1, the blow is in the same direction as that sustained by the connecting rod at the crank shaft bearing.

When the center of mass of the connecting rod is outside of or beyond the axis of the crank shaft journal that is embraced by the connecting rod, as for example, at 2, Fig. 2, the blow on the piston is in a reverse direction to the connecting rod movement and shock.

Or, in other words, if the connecting rod is so proportioned that it has a different rate of oscillation when it is hung as a pendulum by the crank pin bearing than it has when suspended as a swinging body from the piston pin journal portion, there is a decided blow given the piston pin and piston twice each engine revolution, because under such condition, the blow or shock is not struck at the center of percussion.

In order to avoid this the invention herein lies in a connecting rod 3 having a piston pin connection at 4, which is its axis of suspension and a body so designed and massed around a crank shaft portion, indicated at 6, that the center of oscillation of the connecting rod as indicated at 7 is substantially at the axis of the rod bearing for the crank shaft pin 8, whereby the effect of the blow caused by the violent lateral reversal of movement of the connecting rod is struck at substantially the center of oscillation. Or, in other terms, the rod is so proportioned that, when swinging free from the piston pin bearing, it has the same periodicity or rate of vibration that it has when hanging on the crank shaft as a pivot. Under these circumstances, the center of oscillation becomes the center of percussion and under the well known rule of swinging rods, "a blow struck at the center of percussion of swinging bodies produces no effect whatever on the axis of suspension." Or the nodes of vibration set up in the rod are so distributed that the point of suspension or piston pin bearing axis is coincident with one of such nodes.

Thereby the invention particularly eliminates the "side slap" and knocking of the piston or cross-head and concomitant results, the effect being eliminated by proper design of the connecting rod. It is immaterial what the conformation of the connecting rod is to produce this result as it is only necessary that a node or nodal point of this vibration set up in the connecting rod by the lateral shock of reversal coincide with the center of suspension or axis of the piston pin bearing which forms the axis of motion, or that the rod have the same period of oscillation when it swings freely on the axis of the crank shaft bearing as a center, as it does when it swings with the axis of the piston pin bearing as a pivot.

Obviously, changes in the details of construction may be made without departing from the spirit of my invention and I do not care to limit myself to any particular form or arrangement of parts.

What I claim is:—

1. A connecting rod for an engine proportioned to have the same periodicity of vibration when swinging on the piston pin bearing axis as a center that it does when swinging on the crank shaft bearing axis as a center.

2. A connecting rod proportioned to have the center of percussion of the mass thereof substantially coincident with the axis of the crank shaft bearing thereof, when the piston pin bearing axis is taken as the center of motion of the rod.

3. The combination in an engine, of a piston and piston pin with a connecting rod journaled on the pin and so proportioned that the center of percussion of the rod is substantially coincident with the axis of the crank shaft bearing of the rod.

4. The combination in an upright engine, of a piston and piston pin directly connected thereto with a connecting rod journaled on the pin as its center of motion and proportioned so that the center of percussion of the rod is substantially coincident with the crank shaft axis of the pin.

5. The combination in an internal combustion upright engine, of a piston and piston pin with a connecting rod swinging on the pin, and a crank shaft through which the other end of the rod is journaled, the rod being proportioned so that the center of percussion of the rod in relation to the piston pin axis is coincident substantially with the crank shaft pin axis.

6. The combination of a crank shaft, a piston and cross head with a connecting rod journaled on pivoted to the cross head and journaled on the shaft, and so proportioned that the center of percussion of the rod is substantially coincident with the crank shaft pin axis.

7. As a means for preventing blow effects at the axis of motion of connecting rods, a connecting rod formation designed and proportioned to present a natural frequency of vibration characteristic to the rod such as to place a natural nodal point substantially coincident with such axis of motion.

8. As a means for preventing blow effects at the axis of motion of connecting rods, and wherein the rod operatively connects a part traveling in a reciprocating path with a part traveling in a circular path, a connecting rod formation designed and proportioned so as to produce a natural nodal point of the rod in approximate correspondence with the axis of connection of the rod and the part traveling in the reciprocating path.

9. As a means for preventing blow effects at the axis of motion of connecting rods, and wherein the rod operatively connects a part traveling in a reciprocating path with a part traveling in a circular path and in which the axis of motion is shiftable with the reciprocating part, a connecting rod formation designed and proportioned to place the center of percussion of the rod in approximate coincidence with the axis of connection of the rod and the part traveling in the circular path.

In testimony whereof I affix my signature in the presence of two witnesses.

ROBERT A. WEINHARDT.

Witnesses:
 OTTO F. BARTHEL,
 ANNA M. DORR.